T. RYDER
Lamp-Chimney Holder.
No. 64,039.  Patented April 23, 1867.
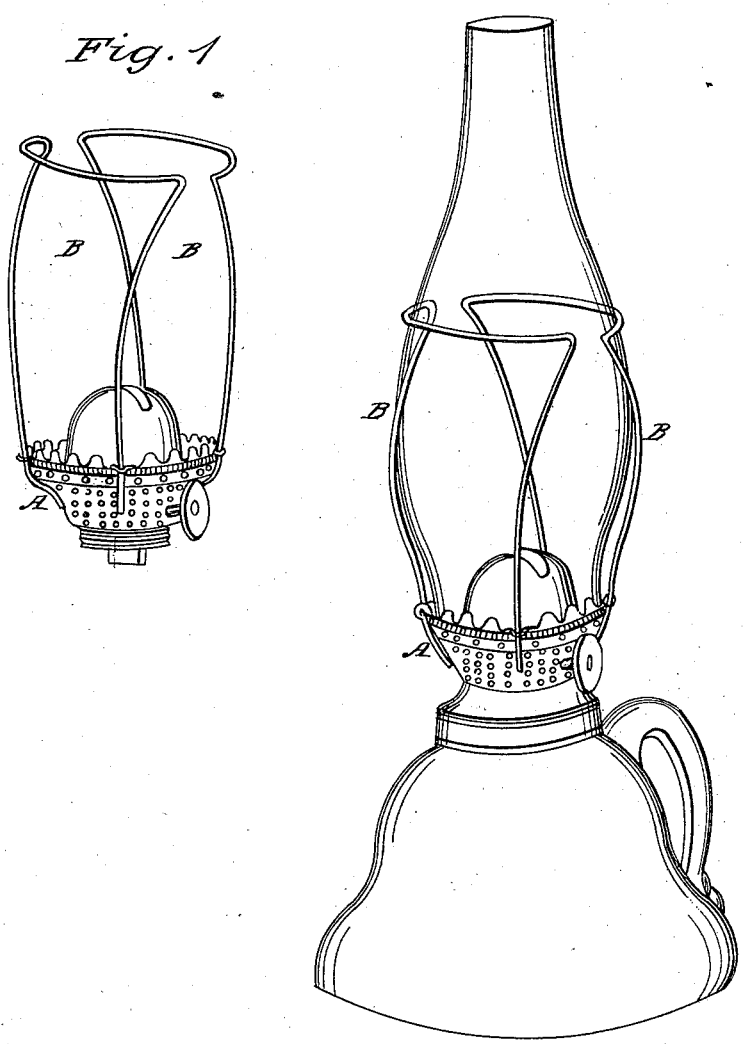
Witnesses:
John D. Thurston
Charles L. Spencer
Inventor:
Thomas Ryder

United States Patent Office.

THOMAS RYDER, OF PROVIDENCE, RHODE ISLAND.

Letters Patent No. 64,039, dated April 23, 1867.

IMPROVEMENT IN CHIMNEY-HOLDER FOR LAMP-BURNERS.

*The Schedule referred to in these Letters Patent and making part of the same.*

TO ALL WHOM IT MAY CONCERN:

Be it known that I, THOMAS RYDER, of the city and county of Providence, in the State of Rhode Island, have invented a new and useful Improvement on a Fluid-Lamp Burner; and I do hereby declare that the following is a full, clear, and exact description of the same, reference being had to the annexed drawings, making a part of this specification, in which—

Figure 1 is a perspective view of my invention.

Figure 2 represents my invention attached to a lamp as in use.

In the accompanying drawings, A, fig. 1, is a burner for a fluid-lamp, it being provided with a screw on the under surface for the purpose of attaching it to a lamp when to be used. B B, fig. 1, are two wires of some springy metal, made a suitable shape at their centres, each to clasp partially around a lamp-chimney, the ends of which are bent at an angle, slightly curving from the centre clasps, and are fastened to burner A at their extreme ends, forming spring clasps, for the purpose of supporting the chimney. The clasps open and close when pressed in their places, as shown in fig. 2. The springs are made a suitable length to the centre clasps to allow each clasp to partially span the lamp-chimney above its largest swell, making it more firmly held on the burner, and forming a lateral support.

My invention consists in a chimney supporter. The advantages can be plainly seen, for the chimney is held more firmly than any other way, easier removed and attached, less liable to get broken, and dispensing with set-screws to hold it on the burner.

I do not claim the burner as my invention, but what I do claim, and wish to secure by Letters Patent of the United States, is—

The combined spring and clasp, in combination with a lamp-burner, for the purpose all substantially as specified.

THOMAS RYDER.

Witnesses:
JOHN D. THURSTON,
CHARLES L. SPENCER.